April 1, 1941.　　　　A. H. BEGGS　　　　2,236,496

CONDENSER CLAMP

Filed Nov. 18, 1937　　　　2 Sheets-Sheet 1

INVENTOR.
Alan H. Beggs
BY Ramsey, Kent, Chisholm + Lutz
his ATTORNEYS

April 1, 1941.                A. H. BEGGS                    2,236,496
                            CONDENSER CLAMP
                        Filed Nov. 18, 1937            2 Sheets-Sheet 2

INVENTOR.
Alan H. Beggs
BY Ramsey, Kent, Chisholm + Lutz
his ATTORNEYS

Patented Apr. 1, 1941

2,236,496

UNITED STATES PATENT OFFICE 2,236,496

CONDENSER CLAMP

Alan H. Beggs, Montclair, N. J., assignor to The Palnut Company, Inc., Irvington, N. J., a corporation of New Jersey Application November 18, 1937, Serial No. 175,260

2 Claims. (Cl. 248—27)

This invention relates to improvements in clamps, and more particularly to improvements in clamps especially adapted for use in securing electrolytic condensers and the like in assembly with a supporting member such as the chassis of a radio receiving set.

An object of the invention is to provide a clamp of the foregoing character which can be assembled with and locked to a supporting member such as the chassis of a radio set without the use of any separate attaching means.

Another object of the invention is to provide a clamp of the foregoing character which can be repeatedly assembled with and disassembled from a supporting member and repeatedly locked in place as a consequence of such assembly.

Another object of the invention is to provide a clamp of the foregoing character of such construction that it will lock a condenser casing or other suitable device in assembly with a supporting member without the use of extra attaching means.

A further object of the invention is to provide a clamp of resilient character which can be assembled with a supporting structure such as a radio chassis by snapping the same into locking engagement with the wall of an aperture in the chassis.

A still further object of the invention is to provide a clamp which will, due to its resiliency, frictionally retain a container, such as an electrolytic condenser container, in assembly with a supporting member.

An additional object of the invention is to provide a clamp for the foregoing purposes made up of a split resilient metallic sleeve which can be sprung into locking engagement with the wall of an aperture in a support and which will expand sufficiently to retain a container frictionally therein.

In carrying out the foregoing and other objects of the invention a clamp for the purposes stated is made from a strip of sheet metal having the proper qualities of resiliency and the like to meet the necessary requirements. This strip is processed in such fashion that a pair of beads are provided symmetrically to the longitudinal center line thereof and extending longitudinally of the strip. The longitudinal edges of the strip are slotted at intervals and the strip is then bent so that the outermost part of each edge is displaced relative to the normal plane of the strip. When the strip has been properly shaped it may be rolled into the form of a split sleeve. This sleeve can be engaged in an aperture in a support, such as a radio chassis, by contracting the sleeve against this normal resiliency until one of the beads will slip past the wall of the aperture, after which the sleeve is permitted to expand so that the recess existing between the two beads on the sleeve is displaced to receive the wall of the aperture. In other words the sleeve expands due to its resiliency until it is locked in assembly with the support, with one bead positioned below the support and one bead positioned above the support. The sleeve, when so located relative to a support, has a normal interior diameter in the portion thereof above the support and preferably also in the portion thereof below the support slightly less than the exterior diameter of the member to be assembled in conjunction with the support. This member, such as the shell of an electrolytic condenser, can be forced into the displaced upper edge part of the sleeve, which upper edge can expand due to the slots therein so that the container when properly inserted into the sleeve can be held therein solely due to the friction developed in the assembly of the parts. If so desired, the lower edge of the sleeve can have its portions provided with inturned flanges which will serve as stops to limit downward movement of the container in the clamp.

Other features, objects, and advantages of the invention will become apparent by reference to the following detailed description of the accompanying drawings wherein.

Figures 1, 2:
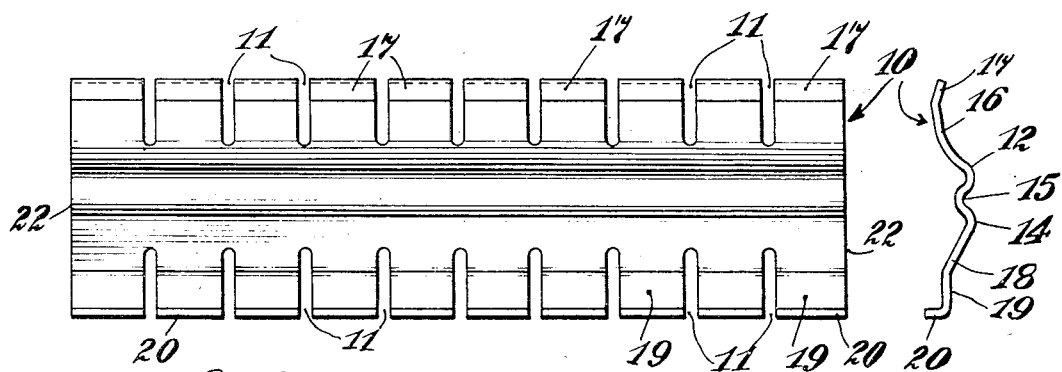
Fig. 1 is a plan view of a strip of metal processed to provide a clamp embodying the present invention prior to rolling of the same into a sleeve.
Fig. 2 is an end view of the same strip of metal.

Referring now to the drawings, 10 indicates generally a strip of some suitable metal preferably possessing suitable resiliency and also preferably a metal having the property of good electrical conductivity, which strip is shown as being partially processed to permit the manufacture of a clamp embodying the invention. This strip is provided at its upper and lower longitudinal edges with a plurality of slots 11 spaced at any suitable distance and of any desired width. Upper and lower beads 12 and 14 respectively are provided in the strip extending in longitudinal direction thereof and so displaced as to provide an interposed indentation 15. The upper part 16 of the strip is displaced relative to a plane passing through the two beads 12 and 14 with the upper ends of the tongues 17 (formed by the slots 11) bent in reverse direction to the normal inclination of the parts 16. The lower half of the strip likewise has a portion 18 offset in a manner similar to the portion 16 with the lower edges of the tongues 19 (formed by slots 11) bent at right angles to provide flanges 20.

Figure 3:
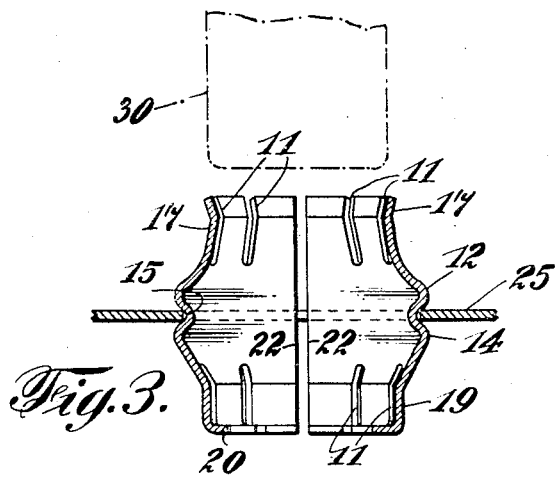
Fig. 3 is a vertical section of a clamp in position in a support such as a radio chassis and showing a container (in dotted lines) in position to be inserted into the clamp.
Figure 4:
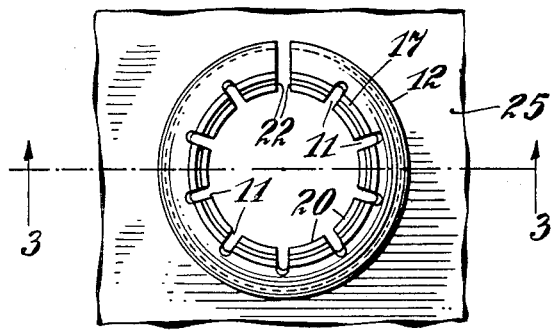
Fig. 4 is a top view of the device shown in Fig. 3.

When the strip has been shaped as shown in Figs. 1 and 2 it may be rolled into sleeve form in such fashion that the flanges 20 extend inwardly of the sleeve. If desired the strip 10 can be initially processed in such fashion as to include the step only of punching the slots 11 therein. The beads 12 and 14 and the indentation 15, together with the other changes in the shape of the strip, can be accomplished, if desired, during the rolling of the slotted strip into a sleeve. By properly shaping the rolls used in producing the sleeve the various configurations can be efficiently obtained. The sleeve so rolled from the strip is of a normal diameter sufficiently great to cause the ends 22 of the strip to be separated as shown in Fig. 3. In such condition the sleeve, due to its resiliency, can be contracted until the ends 22 meet, or if further contraction is desired such can be accomplished by overlapping one end 22 relative to the other. Due to this construction it is possible to assemble the sleeve with an apertured support such as a radio chassis. This arrangement is shown in Fig. 3 wherein it will be seen that the support 25 has an aperture therein and that the sleeve can be assembled in frictional engagement with the wall of the aperture. To accomplish such assembly it is necessary only to contract the sleeve until the maximum external diameter of any part thereof (either bead 12 or 14) is a slight amount less than the diameter of the aperture in the support 25. When the sleeve has been so contracted it can be inserted into the aperture of the support 25, and when so inserted the sleeve is positioned relative to the support in such a position that when the sleeve is permitted to expand the beads 12 and 14 will be located respectively above and below the support with the wall of the supported aperture resting in the indentation 15. In this position the sleeve is in effect locked in assembly with the chassis since, due to its resiliency, its normal action is to expand beyond the limits defined by the engagement of the aperture wall and the indentation 15. When the support is provided with a round aperture in which a clamp is to be inserted, the indentation 15 of this clamp may be knurled or otherwise roughened, or may have stamped in the surface thereof stubby teeth or prongs designed to engage the wall of the aperture in such fashion as to prevent the sleeve from rotating relative to the aperture wall. Such provision can be made in instances wherein the normal frictional resistance between the two parts is not sufficient to prevent such undesired rotation.

When the sleeve has been so engaged with a support it is in proper position to receive a suitable container, such as the shell of an electrolytic condenser. Such a device has been shown in dotted lines in Fig. 3, and comprises a portion of a container 30. This container preferably has an external diameter larger than the minimum internal diameter of the upper half of the sleeve and preferably also of lower half of the sleeve so that the container can be inserted into the upper half of the sleeve only by forcing some of the tongues or fingers 17 outwardly. These tongues being separated by the slots 11 are capable of radial displacement under force so that the container 30 can be pressed downwardly into the sleeve, and when so inserted will be retained therein by the friction set up by the resilient fingers 17. It should be noted that the flanges 20 inwardly turned from the lower edges of the tongues or fingers 19 extend inwardly far enough to serve as a stop to limit the amount of introduction of the container into the clamp. When the assembly has been properly made it will be found that the container for all purposes is securely locked relative to the support, and that the support, clamp and container are in good electrical contact. Consequently it is possible to make an electrical connection with the container by making such connection either to the support or to the clamp. It is also possible to insulate the container from the support by inserting a thin sleeve of suitable insulating material into the clamp, or by sliding such a sleeve of insulating material onto the container before the container is inserted into the clamp.

Figure 5:
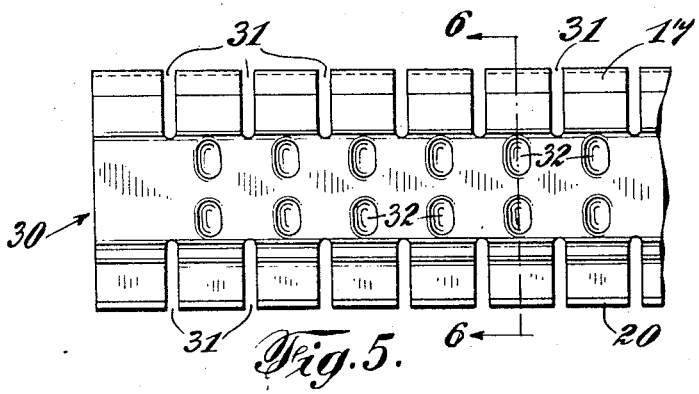
Fig. 5 is a view similar to Fig. 1 of a fragment of a modification of the invention.
Figure 6:
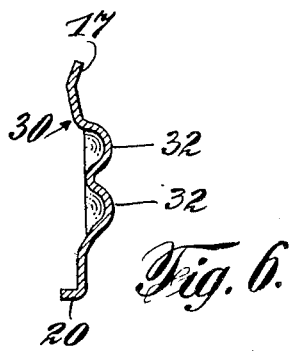
Fig. 6 is a section taken on the line 6—6 of Fig. 5.

In the arrangement shown in Figs. 5 and 6 fragments of a modification of the invention have been illustrated. This device comprises a member 30 which has a plurality of slots 31 similar to slots 11 formed in the upper and lower portions thereof. Instead, however, of providing the beads 12 and 14 and the indentation 15, this member 30 is provided with a plurality of knobs or bumps 32 pressed from the material of the strip in such fashion as to extend outwardly therefrom in the manner shown in Fig. 6. The strip has portions thereof offset from the intermediate part in the same manner as the Fig. 1 and Fig. 2 construction so that the upper and lower sections of a rolled sleeve are of smaller internal diameter than the intermediate part of the device. When this device is assembled in a support aperture the wall of the aperture will be introduced into the space between the upper and lower rows of knobs 32. This device obviously can be attached to supports of various thicknesses.

Figure 7:
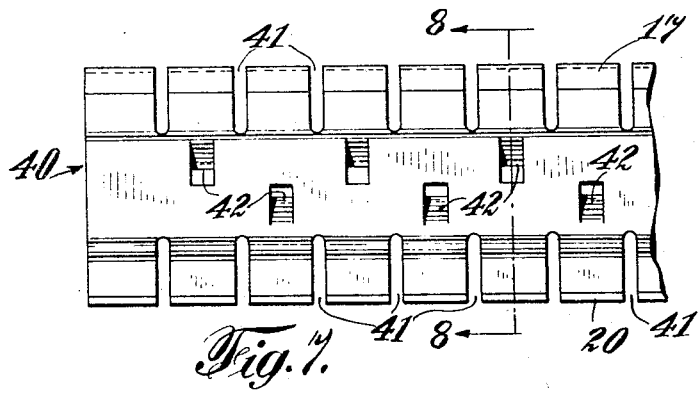
Fig. 7 is a view similar to Fig. 5 of a further modification.
Figure 8:
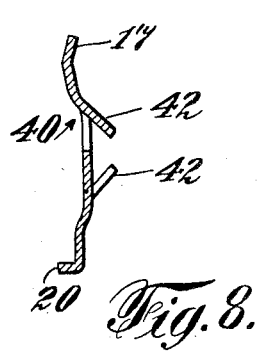
Fig. 8 is a section taken substantially on the line 8—8 of Fig. 7.

In the arrangement shown in Figs. 7 and 8 a device 40 is again provided with upper and lower slots 41, but in lieu of either the beads 12 and 14 or the knobs 32 this member has a plurality of tongues 42 pressed from the upper and lower parts thereof in such fashion that the ends of the tongues are separated the desired distance as shown in Fig. 8. These tongues are pressed from the material of the strip intermediate the various slots 41, and if desired the tongues in the upper row can be in staggered relation to those in the lower right as shown in Fig. 7, or the tongues in the two rows may be in vertically aligned relation. The remainder of the configuration of the strip is substantially similar to that previously described. In use the clamp can be introduced into an aperture in such fashion that the marginal surfaces surrounding the aperture will be between the rows of tongue ends.

Figure 9:
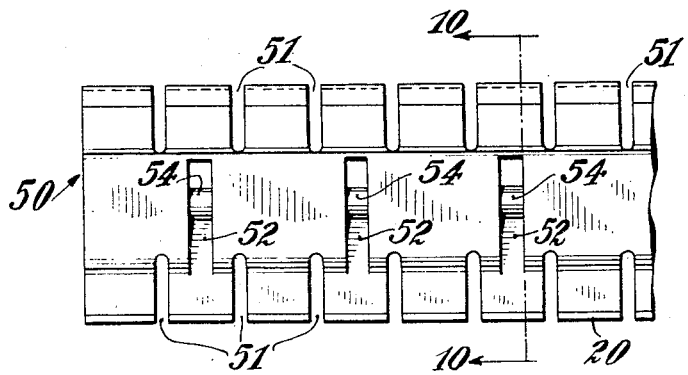
Fig. 9 is a view similar to Fig. 5 of a still further modification.
Figure 10:
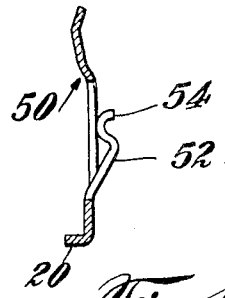
Fig. 10 is a section taken substantially on the line 10—10 of Fig. 9.

In the arrangements shown in Figs. 9 and 10, a strip 50 has slots 51 in the upper and lower portions thereof but use is made of a different type of device for retaining a clamp so constructed in assembly with an apertured support. Such retaining means in this instance comprises a plurality of tongues 52 punched from the material of the strip in such fashion as to extend outwardly from the rolled device in the manner shown in Fig. 10. The end portion of each tongue 52 is formed in somewhat hook fashion as shown at 54, which hook portion is so located as to lie substantially at a point midway the top and lower edges of the device. When this arrangement is assembled in connection with the walls of an aperture in a support, the rolled clamp can be forced downwardly in the aperture until the wall of the aperture is engaged in the various indentations formed by the hook portions 54. In this fashion the device can be resiliently held in assembly with a support.

If it should be desired to increase the resistance of a container held by any of the clamps shown herein against turning in the clamp, increased locking action against relative rotation can be accomplished by altering the shape of some of the fingers 17 in such fashion that they have a shorter radius of curvature than the remainder of the fingers. These fingers so modified will present more or less sharp edges into contact with the container to reduce the possibility of relative rotation between the container and the clamp.

It is to be understood that while the clamps shown herein are of substantially circular shape in cross section, it is contemplated that clamps of various other shapes in cross section can be made in such fashion as to employ the principles set forth herein. The application of this invention to clamps of circular cross section is particularly advantageous since it is possible to manufacture clamps of various diameters from a single continuous blank in strip form by merely cutting the blanks off in the required lengths for various diameters and then rolling the same to such diameters. This device in any form illustrated provides a clamp of a single design which can be used universally for containers of metal or paper or other materials and for containers with or without extruded necks or extruded threaded necks in addition to containers having substantially plain flat bases. Clamps constructed in accordance with this disclosure are very compact and possess the advantage that when the same are used for locking a member to a support, very little excess space beyond the actual size of the member being clamped is required, with the result that other objects can be located in close proximity to the member held by the clamp.

From the foregoing it will be seen that the present invention provides new, simple, and efficient clamp members for securing containers in assembly with an apertured support, which members can be made with a minimum of expense and labor and which require no added parts either for locking the clamp in assembly with the support or for locking a container within the clamp.

It will be apparent that changes can be made in the constructions shown herein, which are shown only as examples of the invention, and therefore any limitations imposed upon the invention are to be only those set forth in the following claims.

I claim:

1. A device of the character described comprising a split sleeve of resilient metal, said sleeve having an indentation extending therearound substantially midway between the top and bottom edges thereof, said sleeve being provided with slots extending longitudinally inwardly from the top and bottom edges thereof defining spring fingers, the lower fingers having their ends turned inwardly to provide a flange of interrupted continuity, said spring fingers being radially yieldable for the introduction of a container into said clamp and removal of such container therefrom while the clamp is in assembly with the wall of an aperture, said flange forming a stop for a container introduced into said clamp.

2. A device of the character described comprising a sleeve of resilient metal, said sleeve being longitudinally split whereby the same can be contracted to reduce the over-all diameter thereof, said sleeve having a peripheral indentation intermediate the top and bottom edges thereof, said indentation being adapted to receive the wall of an aperture in a support upon expansion of the sleeve, the upper edge of said sleeve being formed into longitudinally extending spring fingers to frictionally engage a container, the lower edge of said sleeve being formed into longitudinally extending spring fingers with the ends thereof inturned to form a flange of interrupted continuity, said spring fingers being radially yieldable for the introduction of a container into said clamp and removal of such container therefrom while the clamp is in assembly with the wall of an aperture, said flange forming a stop for a container introduced into said clamp.

ALAN H. BEGGS.